(12) United States Patent
Mulaw

(10) Patent No.: US 7,578,399 B1
(45) Date of Patent: Aug. 25, 2009

(54) SINK ORGANIZER AND SPLASH GUARD

(76) Inventor: Azanaw Mulaw, 1901 Thistlewood Dr., Fort Washington, MD (US) 20744

( * ) Notice: Subject to any disclaimer, the term of this patent is extended or adjusted under 35 U.S.C. 154(b) by 415 days.

(21) Appl. No.: 11/564,587

(22) Filed: Nov. 29, 2006

Related U.S. Application Data

(63) Continuation-in-part of application No. 11/556,013, filed on Nov. 2, 2006, now abandoned.

(51) Int. Cl.
*B42F 17/00* (2006.01)
(52) U.S. Cl. ............... 211/10; 211/13.1; 211/94.01
(58) Field of Classification Search ........... 211/13.1, 211/70.6, 10, 94.01, 90.01, 90.02, 37, 90.04; 4/658; D32/638, 654, 546, 559; 248/27.5, 248/146, 152, 211, 213.2, 205.5, 309.3; 312/140.4, 312/228.1
See application file for complete search history.

(56) References Cited

U.S. PATENT DOCUMENTS

| | | | | |
|---|---|---|---|---|
| 415,634 | A * | 11/1889 | Guptill | 211/41.4 |
| 3,343,772 | A * | 9/1967 | Howell et al. | 248/205.5 |
| 4,713,949 | A * | 12/1987 | Wilcox | 68/235 R |
| 4,722,103 | A | 2/1988 | Kliebert | |
| 4,756,582 | A * | 7/1988 | Heien | 312/229 |
| 4,869,378 | A * | 9/1989 | Miller | 211/94.01 |
| 4,913,390 | A * | 4/1990 | Berke | 248/176.3 |
| 5,012,934 | A * | 5/1991 | Newhall | 211/41.3 |
| 5,109,990 | A * | 5/1992 | Murphy et al. | 211/41.3 |
| D329,280 | S | 9/1992 | Draucek, Sr. | |
| 5,163,567 | A * | 11/1992 | Betts, Sr. | 211/75 |
| 5,632,384 | A * | 5/1997 | Belanger et al. | 211/10 |
| 5,690,255 | A | 11/1997 | White | |
| 5,692,615 | A * | 12/1997 | Fischer | 206/440 |
| 5,711,435 | A * | 1/1998 | Morison et al. | 211/90.01 |
| 5,893,543 | A * | 4/1999 | Emery et al. | 248/205.5 |
| D416,119 | S * | 11/1999 | Newhall | D32/55 |
| 6,021,906 | A * | 2/2000 | Heien | 211/41.3 |
| 6,212,708 | B1 * | 4/2001 | Mulaw | 4/657 |
| 6,253,395 | B1 | 7/2001 | Quam | |
| 6,267,338 | B1 * | 7/2001 | Saylor et al. | 248/200 |
| 6,349,507 | B1 * | 2/2002 | Muellerleile | 52/36.5 |
| 6,619,604 | B1 * | 9/2003 | Stillman | 248/205.5 |
| 6,805,246 | B1 * | 10/2004 | Manabat | 211/13.1 |
| 7,188,738 | B2 * | 3/2007 | Stafford et al. | 211/72 |
| 7,249,680 | B2 * | 7/2007 | Wang | 211/37 |
| 2004/0099617 | A1 | 5/2004 | Elias et al. | |
| 2006/0289372 | A1 * | 12/2006 | Yang et al. | 211/41.3 |
| 2007/0131828 | A1 * | 6/2007 | Chang | 248/205.5 |
| 2008/0053931 | A1 * | 3/2008 | Newbould et al. | 211/88.01 |
| 2008/0053932 | A1 * | 3/2008 | Newbould et al. | 211/88.01 |

\* cited by examiner

*Primary Examiner*—Jennifer E. Novosad
(74) *Attorney, Agent, or Firm*—Sturm & Fix LLP

(57) ABSTRACT

A splash guard organizer for a sink work space. The splash guard organizer includes a vertical back panel with a number of spaced horizontal slots, a flexible water seal located at the bottom of the panel, and a hand access for operation of the water valve. The back panel is supported by a pair of feet extending forward from opposite ends of the panel. A number of fixtures, that have rearwardly extending tabs selectively secured in the slots, are supported in a cantilevered manner. The fixtures are designed to hold a number of individual items useful in the work space, such as bottles, brushes, sponges, towels, and cleaning pads.

18 Claims, 4 Drawing Sheets

SINK ORGANIZER AND SPLASH GUARD

CROSS REFERENCE TO RELATED APPLICATIONS

This application is a Continuation-In-Part and contains disclosure from and claims the benefit under Title 35, United States Code, §120 of the following U.S. Non-Provisional Patent Application: U.S. application Ser. No. 11/556,013 filed Nov. 2, 2006, entitled SINK ORGANIZER AND SPLASH GUARD, and is incorporated in its entirety.

BACKGROUND OF THE INVENTION

1. Field of the Invention

The present invention relates to the field of workplace organizers, and more particularly to a sink organizer and splash guard.

2. Description of Related Art

As can be seen by reference to the following U.S. Pat. Nos. D329,280; 4,722,103; 5,690,255; 6,253,395; and U.S. Publn. 20040099617, the prior art is replete with myriad and diverse workplace organizers.

While all of the aforementioned prior art constructions are more than adequate for the basic purpose and function for which they have been specifically designed, they are uniformly deficient with respect to their failure to provide a simple, efficient, and practical sink organizer and splash guard.

As a consequence of the foregoing situation, there has existed a longstanding need for a new and improved sink organizer and splash guard, and the provision of such a device is a stated objective of the present invention.

BRIEF SUMMARY OF THE INVENTION

Briefly stated, the present invention provides a splash guard organizer for a sink work space. The splash guard organizer includes a vertical back panel with a number of spaced horizontal slots, a flexible water seal located at the bottom of the panel, and a hand access for operation of the water valve. The back panel is supported by a pair of feet extending forward from opposite ends of the panel. A number of fixtures, that have rearwardly extending tabs selectively secured in the slots, are supported in a cantilevered manner. The fixtures are designed to hold a number of individual items useful in the work space, such as bottles, brushes, sponges, towels, and cleaning pads.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figures 1, 2:
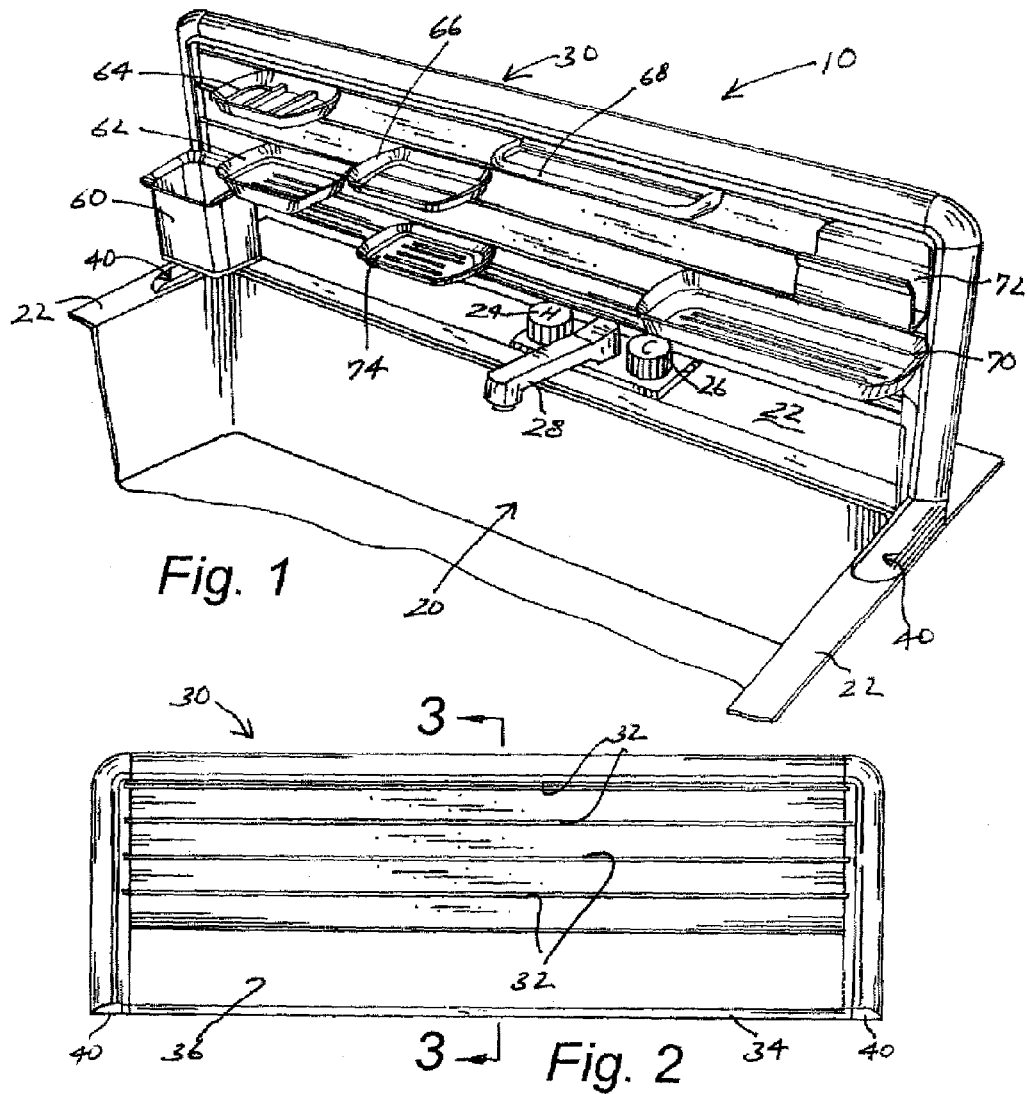
FIG. 1 is a perspective view of a first embodiment of the splash guard organizer of the present invention.
FIG. 2 is a front elevational view thereof.

As can be seen by reference to the drawings, and in particular to FIG. 1, the first embodiment of the sink organizer and splash guard that forms the basis of the present invention is designated generally by the reference number 10.

The splash guard organizer 10 shown in the drawings is specifically designed for a sink work space environment where the sink 20 has a peripheral top surface 22, water valves 24 and 26, and a faucet 28. It is to be understood that the organizer 10 could be used in other work space environments, or be specifically designed for other environments, such as a hobby sewing room, garage work center, laboratories, and home or business offices.

Figure 3:
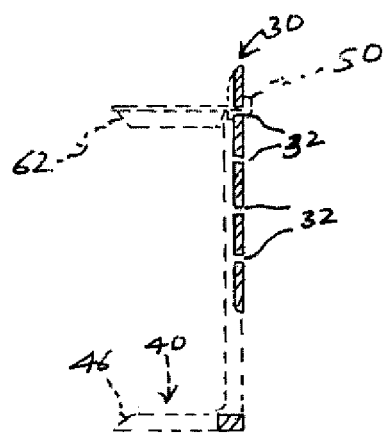
FIG. 3 is a side elevation sectional view taken along line 3-3 of FIG. 2.
Figure 6:
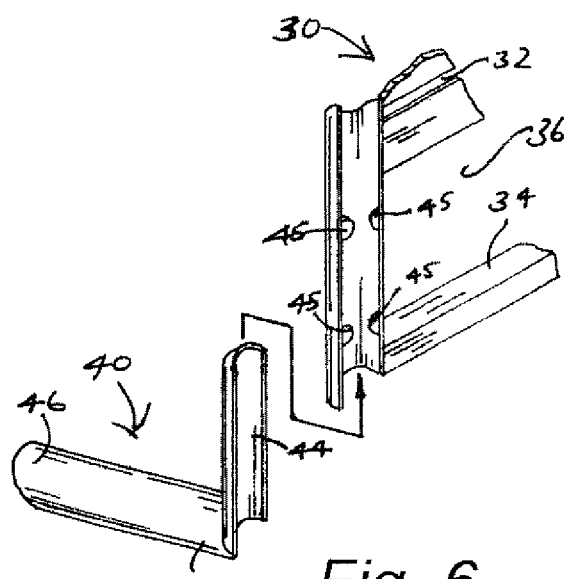
FIG. 6 is a partial perspective view illustrating the attachment of the support feet to one end of the back panel.

As most clearly shown in FIGS. 2 and 3, the organizer 10 has a thin vertically disposed back panel 30 that includes a number of vertically spaced horizontal slots 32, a flexible bottom seal 34, and a hand access opening 36. The back panel 30 is supported in its vertical position by a pair of forwardly extending feet 40 that are attached at each end of the back panel 30 by a frictional snap fitting, as illustrated in FIG. 6. The back end 42 of the feet 40 has an upwardly extending member 44 that selectively engages the bosses 45 on the back side of the panel 30. The forwardly extending free end 46 of the feet 40 rests on a side portion of the sink top surface 22 to stabilize the back panel 30 in its vertical position.

Figure 4:
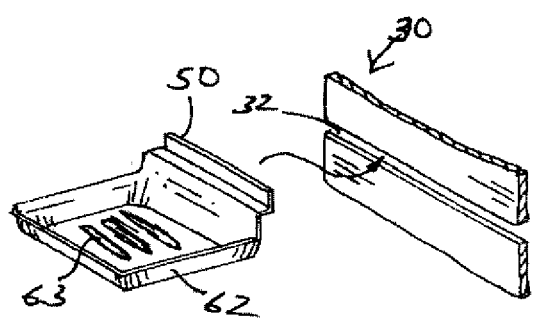
FIG. 4 is a partial perspective view illustrating how one of the fixtures is secured to the back panel.
Figure 5:
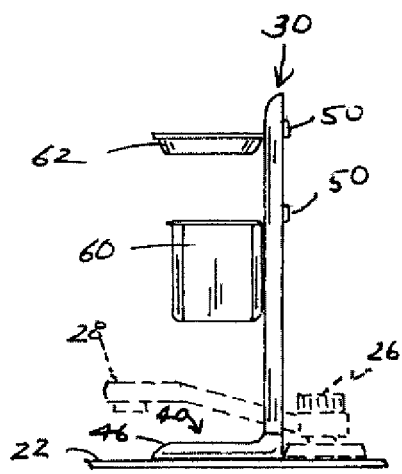
FIG. 5 is a side elevational view thereof.

As best shown in FIGS. 1, 4, and 5, a number of fixtures are selectively attached to the back panel 30 in a cantilevered manner. Each of the fixtures has a tab 50 at the rear that engages a section of one of the slots 32 in the back panel 30. It is to be understood that the individual fixtures may be arranged on the back panel 30 in any position suitable to the user.

The individual fixtures shown in FIG. 1 include a deep dish 60, a shallow dish 62, a divided ring 64, and undivided ring 66, a wash towel rack 68, a wide dish 70, a sponge rack 72, and a flat dish 74.

The deep dish 60 holds liquid soap bottles, cleaning brushes or other items that may require a deep retaining wall.

The shallow dish 62 either functions as a platform to support liquid soap bottles and cleaning brushes, or a dish to hold a bar of soap, a sponge, a cleaning pad, or other items that may not require a deeper retaining wall, but still requires some method of retention. In combination with the divided ring 64 above, it could also support cutlery or dining utensils.

The divided ring 64 in combination with the shallow dish 62 or flat dish 74 directly below can hold dining utensils, cleaning brushes or other items requiring a deep partitioned retaining wall.

The undivided ring 66 in combination with either the shallow dish 62 or flat dish 74 directly below is an alternate to the deep dish 60 and can hold a liquid soap bottle, cleaning brushes or other items that may require a retaining ring.

The wash towel rack 68 provides a place to suspend wash towels and cleaning rags.

The wide dish 70 provides storage space for sponges, bars of soap, cleaning pads, smaller liquid soap bottles, or cleaning brushes laid on their sides.

The sponge rack 72 allows a sponge or cleaning pad to be stored in a fashion that will allow for more effective drainage.

The flat dish 74 holds items similar to the shallow dish 62, but provides for increased access to its contents for easy retrieval and replacement. It could also serve as a platform in combination with the divided and undivided rings 64 and 66.

It is to be understood that other specific fixtures could be provided, and that openings 63 (FIG. 4) may be provided in the fixtures to allow proper drainage. Also, the back panel 30 and the fixtures may be constructed of translucent material to provide a brighter work area.

Figure 7:
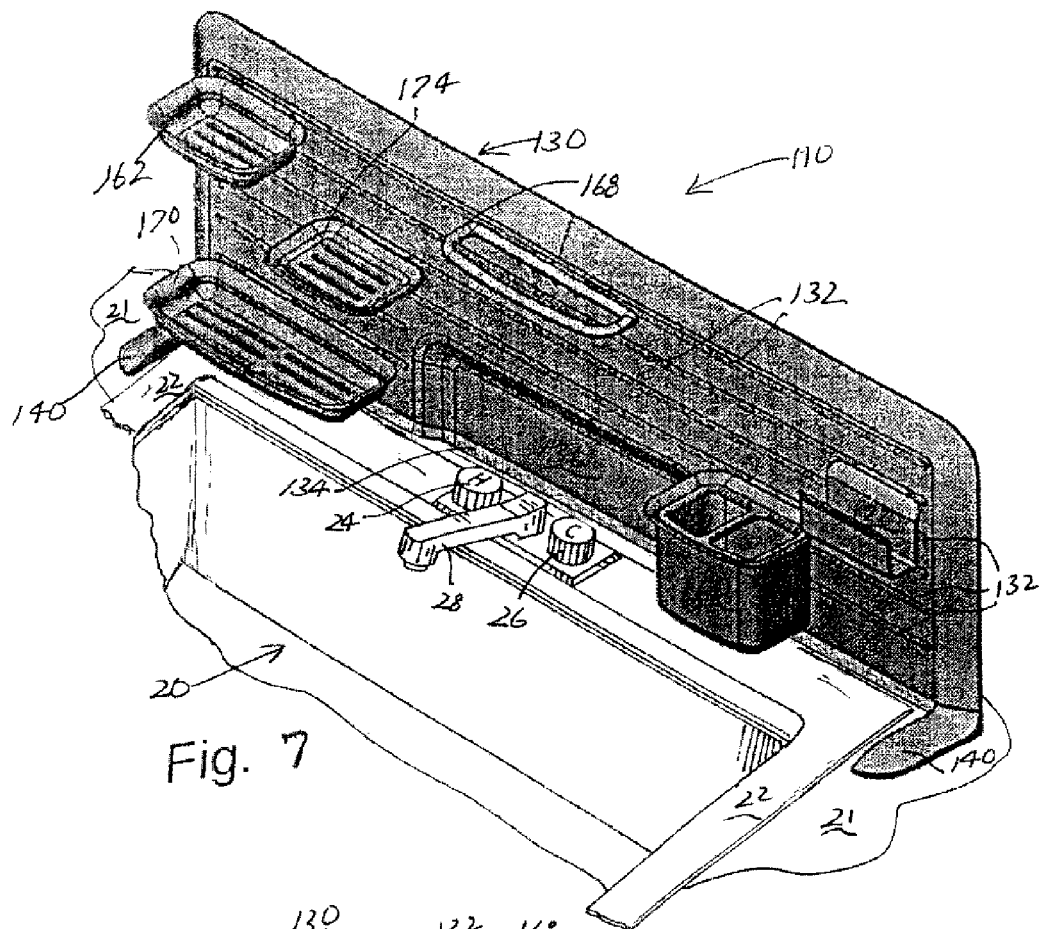
FIG. 7 is a perspective view of a second embodiment of the present invention.
Figure 8:
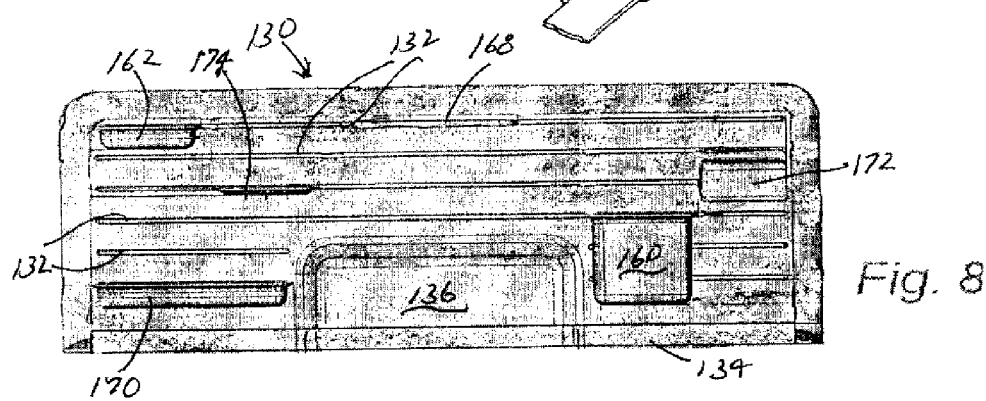
FIG. 8 is a front elevational view thereof.

FIGS. 7 and 8 show a second embodiment of the sink organizer and splash guard designated generally by the reference number 110. This is similar to the splash guard organizer 10 in that it includes a back panel 130 having horizontal slots 132 and a flexible bottom seal 134. However, a hand access depression 136, instead of the hand access opening 36, facilitates the easy operation of the water valves. Also, the support feet 140 rest on the countertop 21 at opposite lateral sides of the sink top surface 22, and the bottom seal 134 sealingly contacts the countertop 21 at the rear of the sink top surface 22.

Similarly, fixtures including a deep dish 160, a shallow dish 162, a wash towel rack 168, a wide dish 170, a sponge rack 172, and a flat dish 174 are supported by tabs (not shown) that engage the slots 132 to support the fixtures in a cantilevered manner. It is understood that other specific fixtures could be provided.

Figure 9:
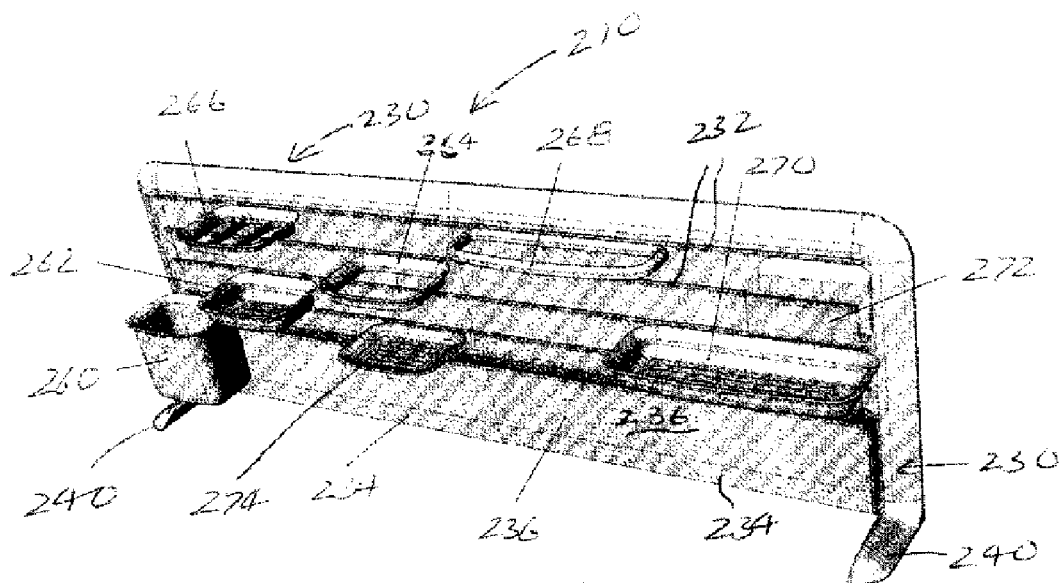
FIG. 9 is a perspective view of a third embodiment of the present invention.

FIG. 9 shows a third embodiment of the sink organizer and splash guard designated generally by the reference numeral 210. This is similar to the splash guard organizer 110 since it includes a back panel 230 with horizontal slots 232 and a flexible bottom seal 234. However, the lower part of the panel above the seal 234 is a solid section 236 with no depression or opening. As with the organizer 110, the feet 240 of the organizer 210 rest on the countertop 21 at the rear of the sink top surface 22. Cantilevered fixtures shown with the organizer 210 include a deep dish 260, a shallow dish 262, a ring 264, a split ring 266, a towel rack 268, a wide dish 270, a sponge rack 272 and a flat dish 274.

Figure 10:
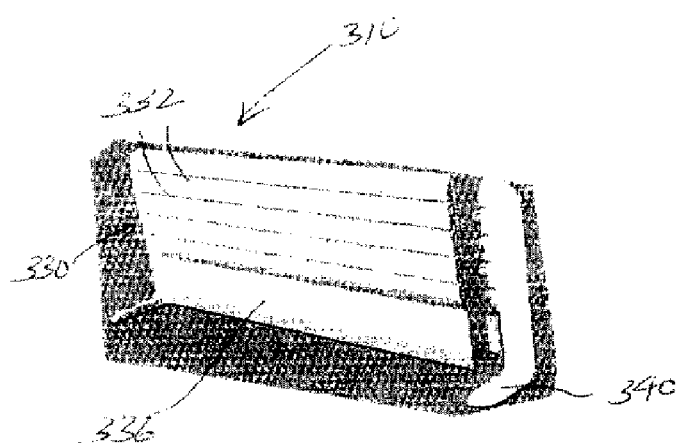
FIG. 10 is a perspective view of a fourth embodiment of the present invention.

FIG. 10 shows a fourth embodiment of the organizer 310 which is similar to organizer 110 except that the depression 336 extends across the entire lower part of the panel 330. Also, FIG. 10 shows a snap fit attachment of the leg 340.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A splash guard organizer, comprising:
    a sink having a peripheral top surface and a water flow control valve extending up from a rear portion of the top surface;
    a vertically disposed thin planar back panel having a front and a rear surface, and having a plurality of vertically spaced horizontally disposed narrow slots with a vertical dimension, wherein the back panel includes a series of solid horizontally disposed sections having a vertical dimension larger than the vertical dimension of the slots, the back panel including a flexible seal disposed at a lowermost portion of the back panel, and being disposed in sealing contact with the rear portion of the top surface of the sink forward of the water valve, and a hand access opening disposed above the seal forward of the water valve;
    a pair of support feet each of the feet having one end attached to a bottom section of the panel, and another free end extending forward of the panel, the support feet being in contact with opposing side portions of the top surface of the sink, whereby the back panel is stabilized and supported in a vertical position; and
    a plurality of fixtures, each of the fixtures having a rearwardly extending tab disposed to selectively extend through a section of one of the plurality of slots and being in contact with the rear surface of back panel to support each of the fixtures in a cantilevered manner extending forward of the front surface of the back panel.

2. The organizer of claim 1 wherein the back panel is formed of translucent material.

3. The organizer of claim 1 wherein at least one of the plurality of fixtures includes drain openings to prevent water from accumulating in the at least one fixture.

4. The organizer of claim 1 wherein the support feet are attached to the back panel by a frictionally secured snap fitting.

5. The organizer of claim 1 wherein at least one of the plurality of fixtures comprises a wash towel rack.

6. The organizer of claim 1 wherein at least one of the plurality of fixtures comprises a ring.

7. The organizer of claim 1 wherein at least one of the plurality of fixtures comprises a divided ring.

8. The organizer of claim 1 wherein at least one of the plurality of fixtures comprises a flat dish.

9. The organizer of claim 1 wherein at least one of the plurality of fixtures comprises a dish.

10. The organizer of claim 1 wherein at least one of the plurality of fixtures comprises a sponge rack.

11. A splash guard organizer comprising:
    a sink installed in a countertop and having a peripheral top surface and a water flow control valve extending up from a rear portion of the top surface;
    a vertically disposed thin planar back panel having front and a rear surface, and having a plurality of vertically spaced horizontally disposed narrow slots with a vertical dimension, wherein the back panel includes a series of solid horizontally disposed sections having a vertical dimension larger than the vertical dimension of the slots, the back panel including a flexible seal disposed at a lowermost portion of the back panel, and being disposed in sealing contact with the countertop adjacent the rear portion of the top surface of the sink rearward of the water valve, and a hand access depression disposed above the seal rearward of the water valve;
    a pair of support feet each of the feet having one end attached to a bottom section of the panel, and another free end extending forward of the panel, the support feet being in contact with the countertop adjacent opposing side portions of the top surface of the sink, whereby the back panel is stabilized and supported in a vertical position; and
    a plurality of fixtures, each of the fixtures having a rearwardly extending tab disposed to selectively engage a section of one of the plurality of slots and being in contact with the rear surface of the back panel to support each of the fixtures in a cantilevered manner extending forward of the front surface of the back panel.

12. The organizer of claim 11 wherein the back panel is formed of translucent material.

13. The organizer of claim 11 wherein at least one of the plurality of fixtures includes drain openings to prevent water from accumulating in the at least one fixture.

14. The organizer of claim 11 wherein the support feet are attached to the back panel by a frictionally secured snap fitting.

15. The organizer of claim 11 wherein the fixtures are selected from a group consisting of a wash towel rack, a ring, a divided ring, a dish, and a sponge rack.

16. A splash guard organizer, comprising:

a sink installed in a countertop and having a peripheral top surface and a water flow control valve extending up from a rear portion of the top surface;

a vertically disposed thin planar back panel having a front and a rear surface, and having a plurality of vertically spaced horizontally disposed narrow slots with a vertical dimension, wherein the back panel includes a series of solid horizontally disposed sections having a vertical dimension larger than the vertical dimension of the slots, the back panel including a flexible seal disposed at a lowermost portion of the back panel, and being disposed in sealing contact with the countertop adjacent the rear portion of the top surface of the sink rearward of the water valve;

a pair of support feet each of the feet having one end attached to a bottom section of the panel, and another free end extending forward of the panel, the support feet being in contact with the countertop adjacent opposing side portions of the top surface of the sink, whereby the back panel is stabilized and supported in a vertical position; and a plurality of fixtures, each of the fixtures having a rearwardly extending tab disposed to selectively engage a section of one of the plurality of slots and being in contact with the rear surface of the back panel to support each of the fixtures in a cantilevered manner extending forward of the front surface of the back panel.

17. The organizer of claim 16 wherein the back panel is formed of translucent material.

18. The organizer of claim 16 wherein the support feet are attached to the back panel by a frictionally secured snap fitting.

\* \* \* \* \*